US007296262B2

(12) United States Patent
Broussard

(10) Patent No.: US 7,296,262 B2
(45) Date of Patent: Nov. 13, 2007

(54) DATA PROCESSING SYSTEM, METHOD, AND COMPUTER PROGRAM PRODUCT FOR GENERATING A GENERIC COMPILATION INTERFACE FROM OBJECT-ORIENTED CODE

(75) Inventor: Scott J. Broussard, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1197 days.

(21) Appl. No.: 10/042,079

(22) Filed: Jan. 7, 2002

(65) Prior Publication Data

US 2003/0131139 A1    Jul. 10, 2003

(51) Int. Cl.
*G06F 9/45* (2006.01)
*G06F 9/44* (2006.01)
(52) U.S. Cl. .................. 717/141; 717/116; 717/118
(58) Field of Classification Search ........ 717/100–103, 717/106–108, 114–122, 136–148, 151–154, 717/159
See application file for complete search history.

(56) References Cited

U.S. PATENT DOCUMENTS

| | | | | |
|---|---|---|---|---|
| 5,590,331 A | * | 12/1996 | Lewis et al. ............... | 717/144 |
| 6,230,160 B1 | | 5/2001 | Chan et al. ................ | 707/103 |
| 6,236,909 B1 | | 5/2001 | Colson et al. .............. | 701/1 |
| 6,237,135 B1 | | 5/2001 | Timbol ..................... | 717/1 |
| 6,836,884 B1 | * | 12/2004 | Evans et al. ............... | 717/140 |
| 2002/0147763 A1 | * | 10/2002 | Lee et al. .................. | 709/20 |
| 2003/0051233 A1 | * | 3/2003 | Krishna et al. ............. | 717/136 |

OTHER PUBLICATIONS

Dale Green, "Trail: The Reflection API", The Java Tutorial. Posted Nov. 27, 1999. Retrieved from <http://java.sun.com/docs/books/tutorial/reflect/>, pp. 1-36.*
IBM Research Disclosure 41584, "Management of Java* Classpath Definitions for Multiple Applications", Nov. 1998, p. 1514.
<http://www.ee.oulu.fi/cgi-bin/man-cgi?javap+1>, Jun. 28, 2001, pp. 1-3.
<http://www.support.lotus.com/sims2.nsf/852561c1006719a9825614100588964/b681539f95f.com>, Running a Notes Java Application Causes: java.lang.UnsatisfiedLinkError:NnotesInitThr.e, Jun. 28, 2001, pp. 1-2.

* cited by examiner

*Primary Examiner*—Tuan Dam
*Assistant Examiner*—John J Romano
(74) *Attorney, Agent, or Firm*—Duke W. Yee; Marilyn Smith Dawkins; Peter B. Manzo

(57) ABSTRACT

A data processing system, method, and computer program product are disclosed for generating a generic compilation interface from a first object-oriented software package. All public classes included in the object-oriented software package are identified. For each of the public classes, all public entities included in each of the public classes are identified. All references to software defined in a second software package are removed from the public entities. An equivalent public class is then generated for each of the identified public classes. Each equivalent public class includes equivalent public entities that include no references to software defined in the second package. Each of the equivalent public classes is compiled. A compilation interface is generated for the object-oriented software package. The compilation interface includes each of the compiled equivalent public classes.

39 Claims, 3 Drawing Sheets

DATA PROCESSING SYSTEM, METHOD, AND COMPUTER PROGRAM PRODUCT FOR GENERATING A GENERIC COMPILATION INTERFACE FROM OBJECT-ORIENTED CODE

BACKGROUND OF THE INVENTION

1. Technical Field

The present invention relates generally to the field of data processing systems and, more specifically to a data processing system, method, and computer program product for generating a generic compilation interface from object-oriented software code.

2. Description of Related Art

Java is a commonly used programming language for the Internet or world wide web. Generally, home pages including hypertext references and reference pages are written in HTML (hypertext markup language). Network browsers installed at user terminals or network servers are Java-enabled and have a Java virtual machine embedded in the browser to respond to Java programs. Applets are small programs which are designed to operate within Internet pages. Typically, the hypertext statement is underscored to indicate that its selection will effect the display of a referenced item.

"Java Beans" are portable platform-independent components written in the Java programming language. "Java Beans" or "beans" are program components that may be used and reused in applets or other Java programs. Java beans allow developers to create reusable software components that can be assembled together using visual application builder tools such as VisualAge by IBM.

Integrated development environments (IDEs) are available to assist developers in authoring software code. An IDE is typically a software application which provides software components to quickly prototype a new application. Some IDEs, such as VisualAge for Java, are visual composition environments whereby a graphical user interface (GUI) is provided to the developer to further aid in the development process.

A problem often arises, however, when using an IDE. New code designed using the IDE often depends on features, packages, methods, fields, variables, or other software code from other packages that are not available within the IDE. In order for the development environment to incrementally compile the new code, it must resolve these references to the other packages.

One solution to this problem is to import the referenced code into the IDE. The referenced code may be stored in a JAR file, thus, requiring that the JAR file be imported. Java beans are packaged and delivered in JAR (Java Archive) files, which is a technology supported by JDK (Java Development Kit) 1.1. JAR files are used to collect Java class files, serialized objects, images, help files, and similar resource files. In many Internet sessions when a user is accessing or connected to a site in the World wide web, the user may need to or desire to acquire a program or other downloadable content, typically in the form of a JAR file, from that site.

The JAR file imported into the IDE, however, often also includes code that has references to yet other code which is not included in the specified JAR and is also not included in the IDE. Sometimes this problem is compounded because the referenced code may be native to an operating system that is different and incompatible with the operating system on which the IDE is executing.

Therefore, a need exists for a method, system, and computer program product for generating a generic, compilation Java Archive (JAR) file which may be easily imported into and used within an IDE.

SUMMARY OF THE INVENTION

A data processing system, method, and computer program product are disclosed for generating a generic compilation interface from a first object-oriented software package. All public classes included in the object-oriented software package are identified. For each of the public classes, all public entities included in each of the public classes are identified. All references to software defined in a second software package are removed from the public entities. An equivalent public class is then generated for each of the identified public classes. Each equivalent public class includes equivalent public entities that include no references to software that is defined in the second package. Each of the equivalent public classes is compiled. A compilation interface is generated for the object-oriented software package. The compilation interface includes each of the compiled equivalent public classes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
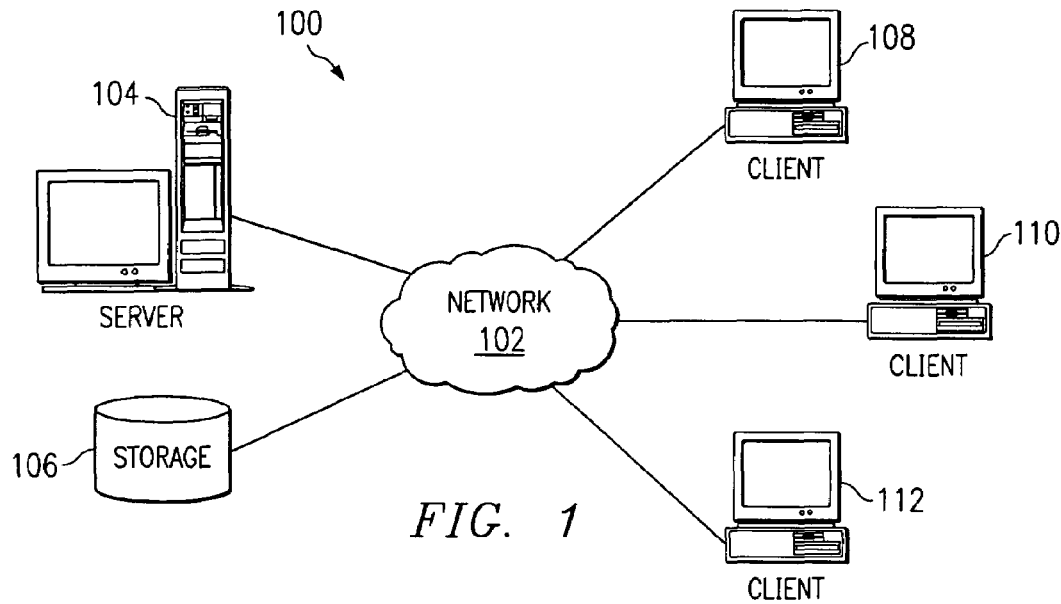
FIG. 1 is a pictorial representation which depicts a data processing system in which the present invention may be implemented in accordance with the present invention.

A preferred embodiment of the present invention and its advantages are better understood by referring to the figures, like numerals being used for like and corresponding parts of the accompanying figures.

The present invention is a data processing system, method, and computer program product for generating a generic compilation interface from a first object-oriented software package. The software package is preferably object-oriented code stored in a Java Archive (JAR) file. After a particular JAR file is selected, the public classes included in the JAR file are identified.

For each of the listed public classes, all of the public entities included in each of the public classes are identified. For the purposes of this application, the term "entities"

includes methods, parameters, fields, interfaces, and all other types software constructs, variables, components, or functions. Thus, public entities are those entities that are publicly available, i.e. accessible by all other objects. A public entity typically is identified as such by the inclusion of the "public" modifier.

All references to software defined in other software packages are then removed from the identified public entities. An equivalent public class is then generated for each of the identified public classes. Each equivalent public class includes equivalent public entities that include no references to software that is defined in other software packages. All "native" attributes are also removed. In addition, return statements are included for methods which require return statements. When an original return statement includes a reference, a default value is substituted for the reference.

A separate output file is created for each of the equivalent public classes. All of the output files are then compiled. The compiled output files are stored in a JAR file which is then used as a generic, compilation interface for the original object-oriented software package.

Because the generic JAR file does not include any references to software defined in other packages or native attributes, the file then can be imported into an IDE and compiled against without generating missing reference errors. A developer may now write code to the generic JAR file and have the IDE incrementally compile the new code without displaying reference problems.

The following is a simplistic example of the present invention.

The following is a first JAR file, jar1.jar, that includes ExampleClass1 and a native method that can be executed only on a particular operating system:

```
    package jar1;
    public class ExampleClass1
    {
        public ExampleClass1()
        {
        }
        public native boolean aMethod(String)
    }
    The following is a second JAR file, jar2.jar, that
    includes an ExampleClass2 and a reference to the native
    method defined in the first JAR file:
        package jar2;
        import jar1.*;
        public class ExampleClass2
        {
            private ExampleClass1 var;
            public ExampleClass2()
            {
                var = new ExampleClass1();
                var.aMethod("string");
            }
            public boolean bMethod(String A)
            {
                return true;
            }
        }
    An application package may be developed, such as:
    import jar2.ExampleClass2;
    public class AppUsingJar2
    {
        public AppUsingJar2()
        {
            ExampleClass2 var = new ExampleClass2();
        }
    }
```

This application package can be developed and compiled using the second JAR file, jar2.jar. However, because the second JAR file includes a reference to a native method that is defined outside of the second JAR file, a dependency will exist that the IDE cannot resolve, thus generating an error.

The present invention describes generating a generic, compilation JAR file that can be used within the IDE against which the application package can be compiled without generating a reference error. The generic, compilation JAR file can be generated from the second JAR file. The following is the generic, compilation JAR file the is generated from the second JAR file:

```
    package jar2;
    public class ExampleClass2()
    {
        public ExampleClass2()
        {
        }
        public boolean bMethod(Stringa)
        {
            return true;
        }
    }
```

This generic, compilation JAR file includes only the public entities of the original second JAR file. All references to code defined in JAR files other than the second JAR file have been removed. Thus, the reference to "aMethod" has been removed. Although the output of generic, compilation JAR file is not executable, it can be compiled against during development of other code. The generic, compilation JAR file does not include any reference to other JAR files.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

Clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
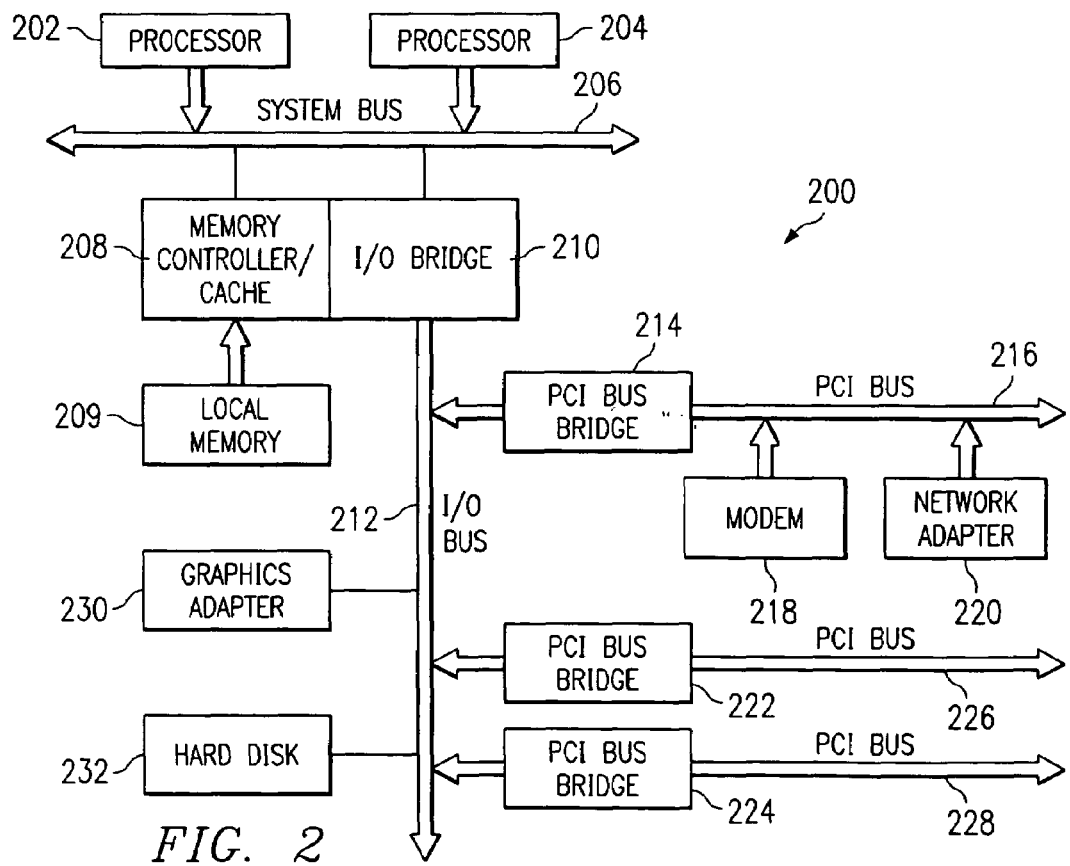
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
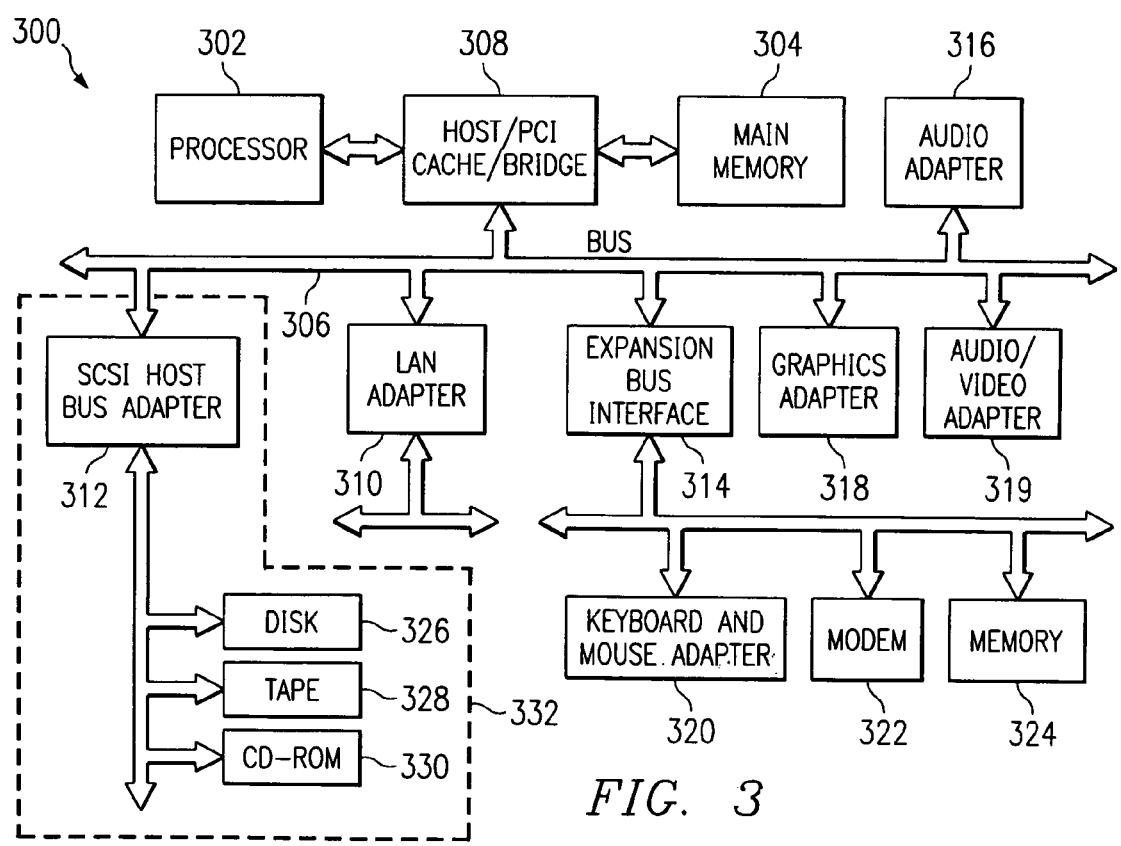
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
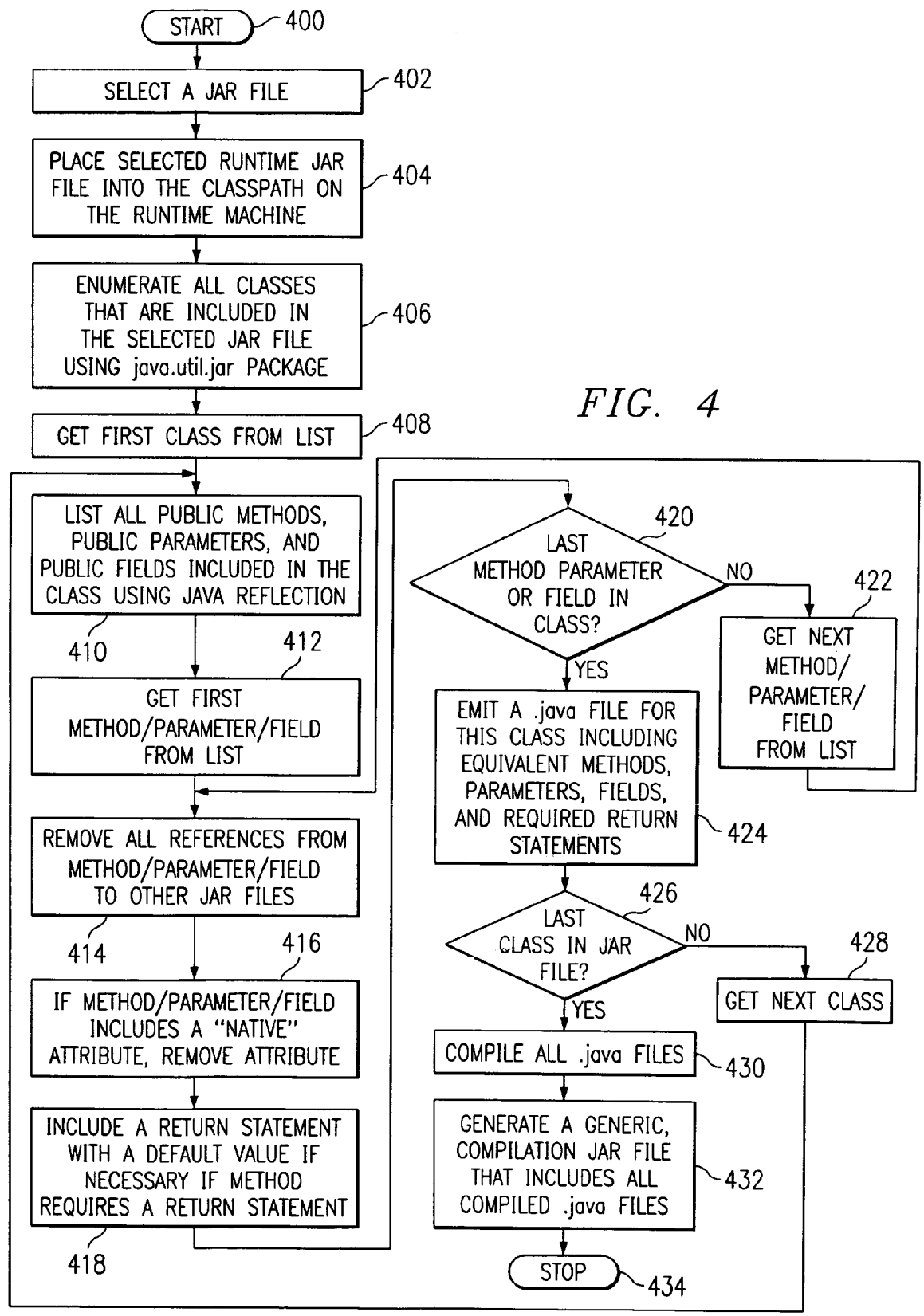
FIG. 4 illustrates a high level flow chart which depicts generating a generic compilation interface for object-oriented software code in accordance with the present invention.

FIG. 4 illustrates a high level flow chart which depicts generating a generic compilation interface for object-oriented software code in accordance with the present invention. The process starts as depicted by block 400 and thereafter passes to block 402 which illustrates selecting an object-oriented software package, such as a Java Archive (JAR) file. Next, block 404 depicts placing the selected runtime JAR file into the classpath on the runtime machine, such as data processing system 300. The process then passes to block 406 which illustrates enumerating all of the classes that are included in the selected JAR file. One method for enumerating classes is the java.util.jar utility.

Block 408, then, depicts getting the first class from the list created as illustrated by block 406. Thereafter, block 410 illustrates listing all public entities, such as public methods, public parameters, and public fields included in the class. One method for listing all public entities of a class is Java's Reflection feature. "Reflection" is one of the application program interfaces (APIs) available as part of Java.

The process then passes to block 412 which depicts getting the first entity, such as a method, parameter, or field included in the list created as illustrated by block 410. Thereafter, block 414 illustrates removing all references to software that is defined in a different software package from the entity, i.e. the method, parameter, or field. Next, block 416 depicts removing the "native" attribute if such an attribute is included. Block 418, then, illustrates including a return statement, with a default value if necessary, if the entity was a method that requires a return statement.

The process then passes to block 420 which depicts a determination of whether or not this is the last entity, i.e. last method, parameter, or field in the class. If a determination is made that this is not the last entity in the class, the process passes to block 422 which illustrates getting the next entity, i.e. the next method, parameter, or field in the class. The process then passes back to block 414.

Referring again to block 420, if a determination is made that there are no more entities in this class, the process passes to block 424 which depicts emitting an output file for this class. Preferably, the output file will be a ".java" file. The java file will include equivalent entities to those included in the specified JAR file, as well as any required return statements. Next, block 426 illustrates a determination of whether or not this is the last class in the JAR file. If a determination is made that this is not the last class in the JAR file, the process passes to block 428 which depicts getting the next class. The process then passes back to block 410.

Referring again to block 426, if a determination is made that this is the last class in the JAR file, the process passes to block 430 which illustrates compiling all of the output .java files. Next, block 432 depicts generating a generic, compilation JAR file that includes all of the compiled .java files. The process then terminates as illustrated by block 434.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a generic compilation interface, from a first object-oriented software package, said method comprising the steps of:
   identifying all public classes included in said first object-oriented software package;
   for each of said public classes, identifying all public entities included in each of said public classes;
   removing all references to software that is defined in a second object-oriented software package from said public entities included in each of said public classes;
   generating an equivalent public class for each of said identified public classes, said equivalent public class including equivalent public entities that include no references to said software defined in said second object-oriented software package;
   compiling each of said equivalent public classes; and
   generating a compilation interface for said first object-oriented software package including each of said compiled equivalent public classes.

2. The method according to claim 1, wherein said step of identifying all public entities included in each of said public classes further comprises the step of identifying all entities included in each of said public classes that include a public modifier.

3. The method according to claim 1, further comprising the steps of:
   determining whether each of said entities includes a native attribute;
   in response to a determination that each of said entities includes a native attribute, removing said native attribute from each of said entities; and
   generating equivalent entities that include no native attributes.

4. The method according to claim 1, wherein the step of identifying all public entities included in each of said public classes further comprises the step of identifying all public methods included in each of said public classes.

5. The method according to claim 1, wherein the step of identifying all public entities included in each of said public classes further comprises the step of identifying all public parameters included in each of said public classes.

6. The method according to claim 1, wherein the step of identifying all public entities included in each of said public classes further comprises the step of identifying all public fields included in each of said public classes.

7. The method according to claim 1, wherein said step of identifying all public classes included in said first object-oriented software package further comprises the step of identifying all public classes included in a Java Archive file.

8. The method according to claim 1, wherein the step of identifying all public classes included in said first object-oriented software package further comprises the step of identifying all public classes included in said first object-oriented software package utilizing a java.util.jar utility.

9. The method according to claim 1, wherein the step of for each of said public classes, identifying all public entities included in each of said public classes further comprises the step of for each of said public classes, identifying all public entities included in each of said public classes utilizing Java Reflection.

10. The method according to claim 1, wherein said step of generating an equivalent public class for each of said identified public classes further comprises the step of generating a separate Java file for each of said identified public classes.

11. The method according to claim 10, wherein said step of compiling each of said equivalent public classes further comprises the step of compiling each said java file.

12. The method according to claim 11, wherein said step of generating a compilation interface for said first object-oriented software package including each of said compiled equivalent public classes further comprises the steps of:
   generating a compilation Java Archive file; and
   storing each said compiled java file in said compilation Java Archive file.

13. The method according to claim 1, further comprising the step of utilizing said compilation interface within an Integrated Development Environment.

14. A data processing system for generating a generic compilation interface from a first object-oriented software package, said system comprising:
   means for identifying all public classes included in said first object-oriented software package;
   means for each of said public classes, for identifying all public entities included in each of said public classes;
   means for removing all references to software defined in a second object-oriented software package from said public entities included in each of said public classes;
   means for generating an equivalent public class for each of said identified public classes, said equivalent public class including equivalent public entities that include no references to said software defined in said second object-oriented software package;
   means for compiling each of said equivalent public classes; and
   means for generating a compilation interface for said first object-oriented software package including each of said compiled equivalent public classes.

15. The system according to claim 14, wherein said means for identifying all public entities included in each of said public classes further comprises means for identifying all entities included in each of said public classes that include a public modifier.

16. The system according to claim 14, further comprising:
   means for determining whether each of said entities includes a native attribute;
   in response to a determination that each of said entities includes a native attribute, means for removing said native attribute from each of said entities; and
   means for generating equivalent entities that include no native attributes.

17. The system according to claim 14, wherein said means for identifying all public entities included in each of said public classes further comprises means for identifying all public methods included in each of said public classes.

18. The system according to claim 14, wherein said means for identifying all public entities included in each of said public classes further comprises means for identifying all public parameters included in each of said public classes.

19. The system according to claim 14, wherein said means for identifying all public entities included in each of said public classes further comprises means for identifying all public fields included in each of said public classes.

20. The system according to claim 14, wherein said means for identifying all public classes included in said first object-oriented software package further comprises means far identifying all public classes included in a Java Archive file.

21. The system according to claim 14, wherein said means for identifying all public classes included in said first object-oriented software package further comprises means for identifying all public classes included in said first object-oriented software package utilizing a java.util.jar utility.

22. The system according to claim 14, wherein said means for each of said public classes, for identifying all public entities included in each of said public classes further comprises means for each of said public classes, for identifying all public entities included in each of said public classes utilizing Java Reflection.

23. The system according to claim 14, wherein said means for generating an equivalent public class for each of said identified public classes further comprises means for generating a separate java file for each of said identified public classes.

24. The system according to claim 23, wherein said means for compiling each of said equivalent public classes further comprises means for compiling each said java file.

25. The system according to claim 24, wherein said means for generating a compilation interface for said first object-oriented software package including each of said compiled equivalent public classes further comprises:
   means for generating a compilation Java Archive file; and
   means for storing each said compiled java file in said compilation Java Archive file.

26. The system according to claim 14, further comprising means for utilizing said compilation interface within an Integrated Development Environment.

27. A computer program product in a data processing system for generating a generic compilation interface from a first object-oriented software package, said computer program product comprising:
   instruction means fur identifying all public classes included in said first object-oriented software package;
   instruction means for each of said public classes, for identifying all public entities included in each of said public classes;
   instruction means for removing all references to software defined in a second software object-oriented software package from said public entities included in each of said public classes;
   instruction means for generating an equivalent public class for each of said identified public classes, said equivalent public class including equivalent public entities that include no references to said software defined in said second object-oriented software package;
   instruction means for compiling each of said equivalent public classes; and
   instruction means for generating a compilation interface for said first object-oriented software package including each of said compiled equivalent public classes.

28. The product according to claim 27, wherein said instruction means for identifying all public entities included in each of said public classes further comprises instruction means for identifying all entities included in each of said public classes that include a public modifier.

29. The product according to claim 27, further comprising:
  instruction means for determining whether each of said entities includes a native attribute;
  instruction means in response to a determination that each of said entities includes a native attribute, for removing said native attribute from each of said entities; and
  instruction means for generating equivalent entities that include no native attributes.

30. The product according to claim 27, wherein said instruction means for identifying all public entities included in each of said public classes further comprises instruction means for identifying all public methods included in each of said public classes.

31. The product according to claim 27, wherein said instruction means for identifying all public entities included in each of said public classes further comprises instruction means for identifying all public parameters included in each of said public classes.

32. The product according to claim 27, wherein said instruction means for identifying all public entities included in each of said public classes further comprises instruction means for identifying all public fields included in each of said public classes.

33. The product according to claim 27, wherein said instruction means for identifying all public classes included in said first object-oriented software package further comprises instruction means for identifying all public classes included in a Java Archive file.

34. The product according to claim 27, wherein said instruction means for identifying all public classes included in said first object-oriented software package further comprises instruction means for identifying all public classes included in said first object-oriented software package utilizing a java.util.jar utility.

35. The product according to claim 27, wherein said instruction means for each of said public classes, far identifying all public entities included in each of said public classes further comprises instruction means for each of said public classes, for identifying all public entities included in each of said public classes utilizing Java Reflection.

36. The product according to claim 27, wherein said instruction means for generating an equivalent public class for each of said identified public classes further comprises instruction means for generating a separate java file for each of said identified public classes.

37. The product according to claim 36, wherein said instruction means for compiling each of said equivalent public classes further comprises instruction means for compiling each said java file.

38. The product according to claim 37, wherein said instruction means for generating a compilation interface for said first object-oriented software package including each of said compiled equivalent public classes further comprises:
  instruction means for generating a compilation Java Archive file; and
  instruction means for storing each said compiled java file in said compilation Java Archive file.

39. The product according to claim 27, further comprising instruction means for utilizing said compilation interface within an Integrated Development Environment.

* * * * *